United States Patent Office.

JOHN A. THOMPSON, OF AUBURN, NEW YORK.

Letters Patent No. 66,650, dated July 9, 1867.

IMPROVED COMPOSITION OF MATTER FOR DISINFECTING AND PREPARING FERTILIZERS.

The Schedule referred to in these Letters Patent and making part of the same.

TO ALL WHOM IT MAY CONCERN:

Be it known that I, JOHN A. THOMPSON, of Auburn, in the county of Cayuga, and State of New York, have invented a new and useful Composition of Matter, for a disinfectant, deodorizer, and fertilizer; and I do hereby declare that the following is a full, clear, and exact description thereof.

I take gypsum of the best quality, having an excess of native sulphur in its composition, dry it so as to free it from moisture, and grind it finely. I then take charcoal from the most porous, hard wood, burned in an earth-pit by the slow process, so as to char perfectly, with the least fracturing of the porous structure. I re-char this charcoal in a cylinder or retort, so as to drive off all carbonic and other gases from its pores. I then granulate this coal, by passing it through a proper mill, breaking the coal in fragments so as to pass through a one-fourth or three-eighth inch mesh sieve, excluding the charcoal from exposure to the atmosphere while grinding, and passing it into an air-tight compartment. From this I pass it into a revolving cylinder with slats nailed upon its inner surface, and with a man-hole or entrance, so arranged as to close air-tight. I then evolve sulphurous acid gas, chlorine, or other disinfecting gases, by any of the well-known processes, and pass it into the cylinder through a hollow journal, and, by revolving the cylinder, the granulated coal becomes fully charged with the sulphurous acid or other disinfecting gas. The charcoal thus charged is then mingled with the ground gypsum, under cover, free as possible from exposure to air, and passed into barrels rendered air-tight by a coating of stucco or other suitable cement applied upon the inner surface of their staves and heads. The proportions of coal and gypsum may be equal, or varied to suit special cases.

I use this compound as a disinfectant and deodorizer by strewing or sprinkling it upon the floors of stables, or upon the contents of privy-vaults, or upon butchers' offal, or any kind of animal or vegetable decomposing substances, thus preventing the escape of ammonia and other noxious gases. All garbage and contents of privy-vaults and urinals should be placed in air-tight safes, and this compound, sprinkled over their surfaces, will arrest putrefaction and the escape of offensive or poisonous gases. The contents of the stable, vault, and garbage-safe can be removed with safety, by a further application of the mixture, to fermenting vats under cover, so as to prevent leaching. Fermentation under my process is hastened by mixing fresh-burned and ground lime with the mass and covering the top with a coat of the previously described compound of coal, sulphurous acid, &c., and gypsum. When fermentation has taken place, I pass the mass through a proper crushing-mill, so as to break all up fine, and then add gypsum, common salt, bone-dust, and hard-wood ashes, varying their proportions in accordance with the special requirements of the soil to which it is to be applied as a fertilizer, or the crop to be produced thereon.

Having thus fully described my invention, and the mode of carrying it into effect, what I claim as my invention, and desire to secure by Letters Patent, is—

1. The within-described composition of matter, consisting of charcoal charged with sulphurous acid or other disinfecting gas, and gypsum, combined and prepared substantially as described, and for the purposes set forth.

2. I also claim the combination of the above-described compound with animal or vegetable substances to produce a fertilizing material, whether with or without the addition of common salt, wood-ashes, bone-dust, or other fertilizing ingredients.

JOHN A. THOMPSON.

Witnesses:
J. J. COOMBS,
JNO. C. WINN.